United States Patent
Glover

(10) Patent No.: US 9,070,112 B2
(45) Date of Patent: Jun. 30, 2015

(54) METHOD AND SYSTEM FOR SECURING DOCUMENTS ON A REMOTE SHARED STORAGE RESOURCE

(75) Inventor: Robin Glover, London (GB)

(73) Assignee: Workshare, Ltd., London (GB)

( * ) Notice: Subject to any disclaimer, the term of this patent is extended or adjusted under 35 U.S.C. 154(b) by 222 days.

(21) Appl. No.: 13/436,577

(22) Filed: Mar. 30, 2012

(65) Prior Publication Data

US 2012/0317414 A1  Dec. 13, 2012

Related U.S. Application Data

(63) Continuation of application No. 13/333,605, filed on Dec. 21, 2011, and a continuation-in-part of application No. 13/155,900, filed on Jun. 8, 2011.

(60) Provisional application No. 61/559,227, filed on Nov. 14, 2011.

(51) Int. Cl.
- *H04L 29/06* (2006.01)
- *G06Q 10/10* (2012.01)
- *G06F 17/24* (2006.01)

(52) U.S. Cl.
CPC .............. *G06Q 10/101* (2013.01); *G06F 17/24* (2013.01)

(58) Field of Classification Search
CPC ........................... H04I 63/0428; H04L 9/0825
USPC .................... 713/164–167, 184, 193; 380/47, 380/227–230, 282, 284; 705/67; 726/4, 17, 726/21
See application file for complete search history.

(56) References Cited

U.S. PATENT DOCUMENTS

| | | | |
|---|---|---|---|
| 7,613,770 B2 * | 11/2009 | Li ................... | 709/203 |
| 7,903,822 B1 * | 3/2011 | Hair et al. ................... | 380/282 |
| 7,941,844 B2 * | 5/2011 | Anno ................. | 726/17 |
| 2003/0046572 A1 * | 3/2003 | Newman et al. ............... | 713/193 |
| 2003/0147267 A1 * | 8/2003 | Huttunen ......................... | 365/63 |
| 2006/0013393 A1 * | 1/2006 | Ferchichi et al. ............. | 380/247 |
| 2008/0310624 A1 | 12/2008 | Celikkan | |
| 2009/0271620 A1 | 10/2009 | Sudhakar | |
| 2010/0217987 A1 | 8/2010 | Shevade | |
| 2011/0107106 A1 * | 5/2011 | Morii et al. ................... | 713/176 |
| 2012/0131635 A1 | 5/2012 | Huapaya | |
| 2012/0173881 A1 | 7/2012 | Trotter | |

FOREIGN PATENT DOCUMENTS

| | | | |
|---|---|---|---|
| WO | WO 0152473 A1 * | 7/2001 | |
| WO | WO 02/101577 | * 12/2002 | |

OTHER PUBLICATIONS

Stephen Voida et al., Share and Share Alike: Exploring the User Interface Affordances of File Sharing, Apr. 22-27, 2006, ACM, pp. 1-10.*

(Continued)

*Primary Examiner* — Bradley Holder
*Assistant Examiner* — Fahimeh Mohammadi
(74) *Attorney, Agent, or Firm* — Ted Sabety, Esq; Sabety + Associates PLLC

(57) ABSTRACT

This invention discloses a novel system and method for displaying electronic documents on remote devices and enabling collaborative editing in conjunction with a content management system where the documents that are shared are securely encrypted on the system in a manner that avoids a single point of failure in the security.

12 Claims, 3 Drawing Sheets

(56) References Cited

OTHER PUBLICATIONS

Dominik Grolimund et al., Cryptree: A Folder Tree Structure for Cryptographic File Systems, Oct. 2-4, 2006, IEEE, pp. 189-198.*

Nathaniel S. Good et al., Usability and privacy: a study of KaZaA P2P file-sharing, Apr. 5-10, 2003, ACM, vol. No. 5, Issue No. 1, pp. 137-144.*

M. Eric Johnson et al., The Evolution of the Peer-to-Peer File Sharing Industry and the Security Risks for Users, Jan. 7-10, 2008, IEEE, pp. 1-10.*

Non-final office action issued for U.S. Appl. No. 13/799,067 on Oct. 30, 2014.

* cited by examiner

METHOD AND SYSTEM FOR SECURING DOCUMENTS ON A REMOTE SHARED STORAGE RESOURCE

PRIORITY CLAIM

This application claims priority as a continuation in part to U.S. patent application Ser. No. 13/333,605 filed on Dec. 21, 2011 and incorporates that application by reference. This application claims priority as a continuation-in-part to U.S. patent application Ser. No. 13/155,900 filed on Jun. 8, 2011 and as a non-provisional continuation-in-part to U.S. Provisional Patent Application No. 61/559,227 filed on Nov. 14, 2011 both of which are herein incorporated by reference in their entireties.

FIELD OF INVENTION

This invention provides a mechanism whereby a group of people operating individual computer devices can view and share and collaboratively edit an electronic document stored in a remote data repository. The users can operate the invention in order to secure the data that they store in the remote data repository. The invention can also be used to facilitate shared service by providing a mechanism to securely share secured content among users of the invention. The content is stored in encrypted form and only is in free-text when requested by authorized users.

BACKGROUND

Electronic documents, for example text documents, are now often stored in a remote data repository, sometimes referred to as an Entity Content Management system (ECM) or Document Management System. This type of system has one or more servers acting as storage locations for the document. The documents stored on the system can be accessed by users operating their own computing devices. In order to facilitate collaborative editing of a remotely stored document, security protocols and data integrity protocols are instituted. Security is enhanced by only storing encrypted versions of the documents and controlling access to the decryption keys in a manner that does not involve storing the decryption keys in the clear in the system either.

SUMMARY OF THE INVENTION

The invention involves a novel use of encryption key protocols to establish authority to remotely access document file directories on a central server. The invention involves assigning a master public/private key pair to each user of the system. In addition, documents as well as folders or directories have key pairs. By using verifiable chains of keys in order to grant a user access to a document, the system is resilient to data security attacks. Folders or directories that contain encrypted documents may be shared by virtue of sharing the keys associated with the folder or directory, that is, by means of the folder or directory key authority.

DETAILED DESCRIPTION OF THE PREFERRED EMBODIMENTS

Figure 1:
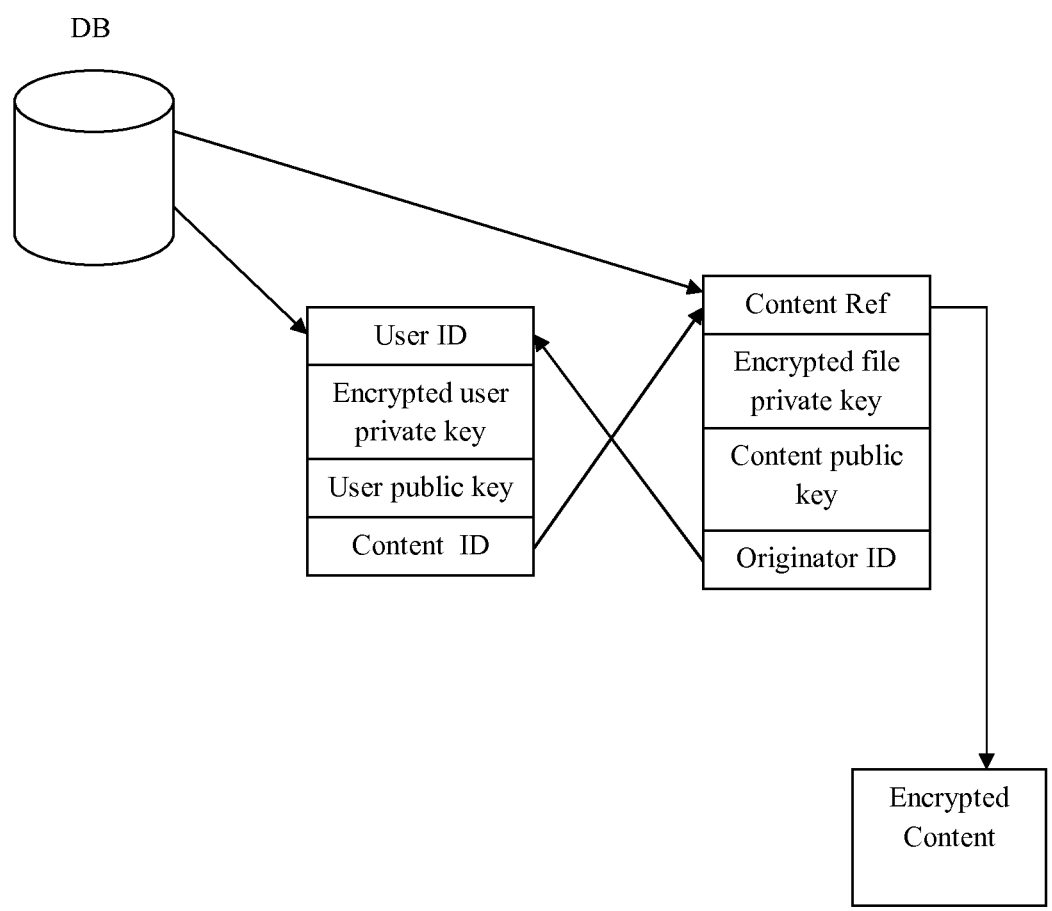
FIG. 1 System Diagram.

The method and system operates on one or more computers, typically using one or more servers and one or more remote user's computing devices. A customer's device can be a personal computer, mobile phone, mobile handheld device like a Blackberry™ or iPhone™ or a tablet device like the iPad™ or Galaxy™ or any other kind of computing device a user can use to view and edit an electronic document. The user devices are operatively connected to the remote server using a data network. The invention does not require that the data network be in continuous contact with the remote file server. The invention works in combination with document collaborative editing system (CES). The system can be embodied in a client/server architecture, whereby an executable code operates on the user's remote device and interacts with processes operating on the CES. In other embodiments, the same system can be running on the user's remote device by means of scripts or apps that are downloaded and executed within an Internet web-browser.

The user's remote computer is operatively connected to a data communication network, typically the Internet. This may be directly or indirectly through another network, for example a telephone network or a private data network. The user operates a client software on their computing device that communicates with the CES.

In one embodiment, the documents stored on the CES can be encrypted. In one embodiment, each document has its own symmetric key is assigned. When a user wishes to receive a document, a private key is generated that is used to encrypt the document already encrypted using the symmetric key. The private key is stored in an encrypted state using the user's data password and the clear version of the private key is deleted. When the user is present on the CES, the CES system can do something with the document. When the user logs off, then the password is lost because it is not stored in the clear. The document only becomes accessible again when the user logs in with their password.

Online file and document storage and sharing services have a dilemma regarding how to deal with encryption of the uploaded content. The traditional approaches which involve encryption on the server do not encrypt uploaded content—the content is stored with no encryption on whatever basic storage medium is used by the service. Disadvantages of this approach include: (1) Vulnerability to illicit retrieval of content by staff or hackers, (2) all content is readable if the storage medium is stolen physically or subject to unauthorized duplication.

Coding errors that result in access controls are not correctly applied will mean that users may gain access to other users documents. Other traditional forms of security include encrypting all uploaded content using a single encryption key. While the storage medium is now secure if compromised, the single key becomes a point of risk. That is, the single encryption key must be known to each server on the system to allow it to encrypt and decrypt content. Hackers and/or staff may gain access to this key. In addition, this approach suffers the risk that once an unauthorized party has gained access to the single encryption key, all content becomes vulnerable in the same way as unencrypted content.

Another traditional approach is to encrypt uploaded content using encryption keys that are generated (and different) on a per-user, per item or other basis. In this case, the generated keys must be stored in some fashion so that they are available to decrypt the content when it is downloaded. The server software must have functionality to access this storage and select the right key to decrypt a particular content item. Hackers who gain access to the system or steal a physical or virtual copy of one or more servers will be able to track this functionality and learn how to recover the appropriate key for a particular piece of content. Another drawback is that if the key storage is compromised as described above then the system is vulnerable to data theft in the same way as an unencrypted system. As a result, sharing items between users to allow collaboration becomes troublesome under some key schemes (such as one encryption key per user). Additionally, the user of any of the above services may choose to encrypt or password protect sensitive data before uploading. This would generally ensure that the data is secure while stored online (provided the encryption or password protection is not flawed), but has the following drawbacks: (1) the user must take responsibility for managing (storing and not losing) encryption keys and passwords, (2) when sharing with others, the user must take care of key or password distribution. Although this can be handled securely for public key style cryptography, secure key distribution is not possible for password protected content. Additionally, even where secure key distribution is possible it imposes a heavy burden on the user.

Most importantly, the user and anyone he shares the content with must have suitable software installed to handle encryption/decryption or password protection on the device used to access the content. This may exclude access from mobile devices and other non-PC computers. As a result the server can provide no added value to the user—it simply acts as an online store of uploaded encrypted data. Therefore traditional approaches to cloud based security for servers cannot provide services such as HTML or image based rendering of content for use on non-encryption capable devices
 Document comparison or content management
 Metadata scanning or removal
 Other services requiring access to the content of the document on the server side.

The solution to the problem is summarized as follows: Each user of the shared storage environment is assigned a master encryption key, which is a private/public key pair. The public/private key pair work together such that the public key can be publicly known, but the private key is kept secret. Anyone can use the public key, to encrypt content, but only the holder of the private key can decrypt it. The user public key is stored on the server in plain (unencrypted) form. In addition, an encrypted form of the user private key is stored on the server. The user private key is encrypted using a further encryption key (referred to as the user secret key) supplied by the user along with each request to the server that needs to access the user private key. The user secret key is not stored on the server, although irreversible cryptographic hashes (or other types of one-way encryption) of it may be stored on the server. These may be used by the server to verify that a person submitting a user secret key as an authentication token has presented a valid key. This may used to verify that a challenge response passphrase is correct. The user secret key may be derived from a passphrase entered by the user or may be provided in some other way, for instance from a hardware token or a file stored on a removable device. Each piece of content (text, image, video, audio or other data) uploaded to the server for storage is encrypted with a different, newly generated, encryption key—this is the item key. The item key is encrypted using the uploading user's public key, which is available at all times on the server. The encrypted item key is stored in a database. The unencrypted copy of the item key is discarded and never stored. As a result only the user that is uploading the content can access the content file, or someone the user shares their private key with.

To download the encrypted content item, the user sends their user secret key to the server as part of the download request. This may be in combination with a passphrase to verify authenticity. The server can then use the secret key to decrypt the user's private key from the encrypted version which has been stored. Then the system can use the user's private key to decrypt the item key. As a result the system can use the item key to decrypt the item content and return the item content to the user. Once the request is complete, the server wipes from computer memory, that is, removes from any data storage, the user secret key and the decrypted copies of the user private key and item key from memory. In this embodiment, the item key can be the key to a symmetrical encryption algorithm, where the same key is used to encrypt as to decrypt the content. Alternatively, in another embodiment, the item key can be replaced by an item public/private key pair.

This approach also supports implementing secure methods to cause other actions that require access to the document content may also be carried out by the server in response to a request from the user that contains the user secret key. For example, a content item can be shared with another user of the system by the following mechanism: First, the user that uploaded the content item sends a share request to the server, accompanied by their user secret key. The server uses the secret key to decrypt first the user private key, and then uses the user private key to decrypt the item key. However, before any decryption of the content occurs, the server re-encrypts the item key using the public key of the destination user with whom the content item is to be shared. This newly encrypted copy of the item key is stored in the database, typically in a data record that references or can be logically connected to permission data that grants access to the item to the destination user. The database can have data records associated with each user and each content file. The user's data record contains the stored keys and passphrase, as well as an index to the data record of that user's uploaded content (or content where that user is designated the owner or originator.) The originator can be anyone with root authority over that particular content file item but is typically the person who uploads a file into the system. The user's data record can also contain references to content where the user has permission to view the content. Each content file can also have an associated data record in the database. That data record contains the item keys and can also contain a reference to the user designated the owner of the content. As a result, both the uploading user, and the downloading destination user can download the content item by providing their appropriate user secret keys. This is accomplished by the system verifying the identity of either user that seeks access and then automatically selecting the appropriate version of the encrypted item key to decrypt.

The user can submit their name or passphrase as well as their secret key. The system will generate the one-way encrypted version of the secret key and then query the database using the user name. The name or passphrase brings up the data record, and then the encrypted secret key value that is stored in the data record is compared to the generated version. If there is a match, then the user is authenticated. Next, the system can use the user secret key to decrypt the user private key and then use that to decrypt the encrypted version of the item key stored in the data record. Then the system can seek the encrypted version of the content file and decrypt it for the authenticated user.

This approach exhibits several advantages. First, the information needed to decrypt any content item is never permanently stored on the server, making the system resilient to attacks. In particular, access to a copy of the server data store, software and encrypted content items is not sufficient to allow an attacker or malicious staff member to decrypt any user content. Further, sharing content between users is handled by the server, freeing the user from the need to worry about sharing encryption keys or password distribution. Access permissions on content items are backed up by the existence of or non-existence of the proper chain of encryption keys granting a user access to a content item. In other words, a malicious alteration of the database that contains permission tracking data will not work because the chain of keys will not support it. Instead, the system will appear to fail to deliver the content to the surreptitiously designated recipient. Thus a programming error that causes the system to fail to apply access permissions to content will not result the server allowing users to download content they have no right to—the server will try (and fail) to decrypt the content item because there is no copy of the item key that has been encrypted with the user key of the unauthorized user.

Additional improvements to securing on-line shared resources can be accomplished so as to avoid additional cases of security breaches. For example, in the case of a compromise of the user's secret key (or the information that it is based on such as a passphrase). Since this information is transferred to the server and processed on the server, precautions should be taken in handling this communication and processing. In the preferred embodiment, communication with the server is secured by encryption, for example by HTTPS, SSL and other kinds of secure protocols that avoid transmission of text or information in the clear. In addition, in the preferred embodiment, the server will remove from, erase, or wipe the computer data storage, (memory and any other storage devices) used to store this information when the request for access to the data is complete. An attacker who is able to take control of a server while it is operational may be able to monitor memory and capture any or all of user secret keys, user private keys, document keys and/or decrypted content item data. This is however a far more challenging task than extracting passwords and encryption keys from an offline server or database since the attack has to take place in real time and remain undetected by the operators of the service.

Additional security improvements can be considered. A typical on-line content or file sharing and collaboration system has data representations of users, folders, files and permissions. Such a basic service would be expected to have the following features:

Provision for users to register with an identifier (typically an email address) and a password to authenticate them Provision for the storage of files and the organization of files into folders Ability to upload new files and download files that have already been uploaded Ability to upload new versions of existing files and maintain a version history (see/download previous versions)

Ability to share files or folders (and all files within them) with other users.

Maintenance of access control lists (ACLs) which record which users are entitled to access the contents of which files and folders.

Storage of file contents in a file store of some description (hard disk, cloud storage, SAN/NAS Network Accessed Storage etc)

Storage of other data (user details, file names, folder contents, ACLs etc) in some form of database (relational or otherwise) or equivalent data storage medium.

Security of such a system is enhanced by organizing the encryption keys to be associated with the users and also the content. In this embodiment of the invention, when each user is registered with the system, they must provide a unique piece of information (the user secret) which will be used as the basis of all encryption for that user. The user secret may be based on a text passphrase (which preferably would be distinct from the user's logon password) or may be derived from some other source. The user secret can be transformed by the server into a symmetric encryption key (the user secret key) by a process such as a one way cryptographic hash. Techniques to derive encryption keys from passwords or other data such as those described in RFC 2898 may be used. The user secret is never stored on the server or in the server database or datastore, although a secure, one-way, cryptographic hash (or other one-way encryption) of the user secret may be stored to allow the server to validate that a supplied user secret is correct.

Upon registration of a new user the server will also create a new, randomly generated, public/private key pair. Various public key cryptography systems are suitable for the generation of this key pair, for instance RSA (Rivest-Shamir-Adleman) or ECC (Elliptic curve cryptography). The key length should be chosen with regard to the strength of encryption required for the file content. For instance recent recommendations indicate that an RSA key of 3072 bits or an ECC key of 256 bits should be used for equivalent security to an AES encryption at 128 bit strength. This key pair makes up the user private key and user public key. The same technique can produce a key pair for the content file item.

The public key of the generated user key pair is stored in the server database along with the new user details. The user private key is encrypted using the user secret key and a symmetric encryption algorithm (for instance AES) and the encrypted version is stored in the database along with the new user details. A one way cryptographic hash of the unencrypted user private key (for example an SHA256 hash) may also be stored in the database.

Uploading Files

When a new file is uploaded to the server by the user, another new, randomly generated item public/private key pair is created as described above. See FIG. 1. The public key is used to encrypt the content file and the free-text or unencrypted version of the file is discarded. The private key from this item key pair is encrypted using the public key of the uploading user, who presumably owns or controls the content. The new item public key and encrypted private key thus generated are stored in the server database alongside the data identifying the newly uploaded content file. This key pair makes up the file private key and file public key (synonymous with the item private and public key pair).

There is no need for the server to have access to the user secret or user secret key in order to perform a file upload. This allows automated uploads via a service without the need for the service to hold the user's secret information—for instance allowing a user to email files to be uploaded to a special email address.

The newly uploaded file is encrypted using the file public key and the encrypted version is stored by the server in its content store. A typical place to store this encrypted key would be alongside the permission record on the server that identifies the uploading server as having permission to access the newly uploaded file. See FIG. 1. It is normal practice when encrypting a large block of data with a public key cryptography scheme to actually create a random symmetric key (which could be an AES key), encrypt the bulk data using that key and then encrypt the symmetric key using the public key cryptography. The stored data then includes the encrypted symmetric key and the encrypted document data.

If updated versions of an existing file are uploaded to the server at any time, then they may be encrypted as described above, using the existing file public key.

Downloading Files

Figure 2:
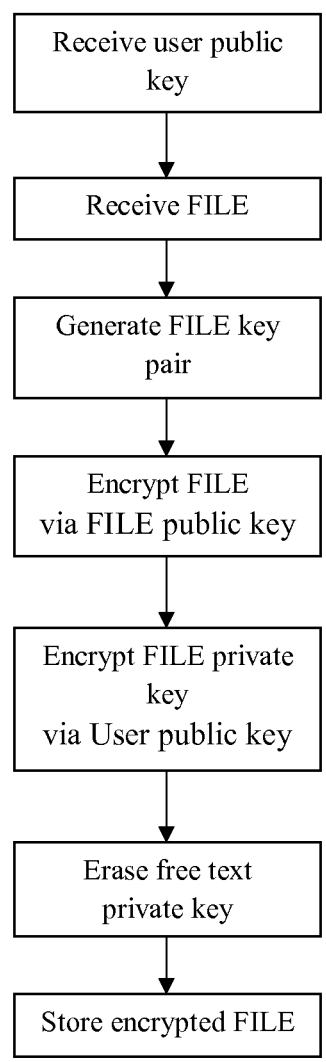
FIG. 2. Flowchart for encryption of file.
Figure 3:
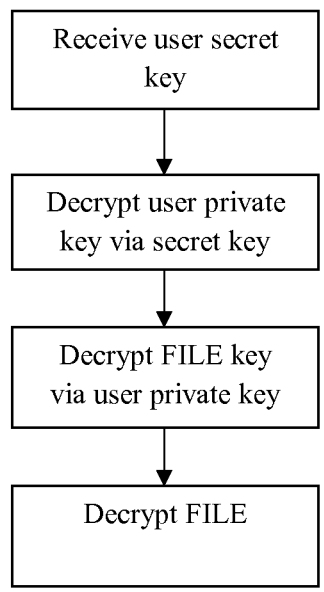
FIG. 3. Flowchart for decryption of file

In order to download a file, the user makes a request to the server specifying which file and optionally which version of the file. Along with this request the user sends their user secret key or information sufficient to derive it (such as the passphrase from which it is generated). The user secret key is used to decrypt the encrypted version of the user private key (which has been retrieved from the database). See FIG. 2. The user private key is used to decrypt the encrypted version of the file private key (again, which has been retrieved from the database). The file private key is used to decrypt the file content, which is then returned to the user. In order to maintain maximum security the server may wipe the memory (that is, remove from computer memory or other data storage) used to store the unencrypted version of the file contents and the various encryption keys used when the request is complete.

Sharing Files

Assume that a file has been uploaded by a user 'A' who now wants to share that file with user 'B' so that user B can view and edit it. In order to enable this file sharing, user A makes a sharing request to the server specifying the file to share and who to share it with. Along with this request the user sends their user secret key or information sufficient to derive it (such as the passphrase from which it is generated). The database search described above is carried out to retrieve the file private key for the file to be shared.

The public key for user B is retrieved from the database and used to create a new encrypted version of the file private key. This second encrypted copy of the file private key is stored in the database, in one embodiment, together with the new permissions record that will grant user B access to the file. Note that the original copy of the encrypted file private key is not overwritten or replaced. Instead, after completing the sharing procedure there are now two separate encrypted copies of the file private key stored, one for each user who has access. Sharing to more than one additional user proceeds in the same manner (the sharing request may allow multiple recipients to be specified or multiple requests may be made). A separate encrypted copy of the file private key is stored for each user who is granted access to the file.

When a user sends a request to download a file the correct encrypted copy of the file private key is selected by the server by retrieving it from the database. In one embodiment, the data record for a user includes one or more references to locations where an encrypted copies of file private keys that are encrypted by that user's public key are stored. If a user attempts to download a file to which they have not been granted access, they will have no way to obtain a correctly decrypted copy of the file private key, and therefore no way to access the file contents. This restriction applies independently to any code on the server which checks for permissions for a user to access a file. In other words, corruption or surreptitious interception of the database queries will not suffice to crack the security of the encryption key structure that is applied.

The system can also support revocation of access. If the sharing permission assigned to a user is revoked then the copy of the encrypted file private key that was encrypted by the user's public key will be discarded from the database along with removing any permissions record that grants access to that user to the file.

Sharing Folders

Sharing folders (also referred to as a directory) requires additional complexity. It is not sufficient to just treat the action of sharing a folder with user B as equivalent to sharing each file in the folder with user B. That would give user B access to the private file key for all existing files in the folder, but they would not gain access to the encryption keys for files subsequently added to the folder. Instead, when a new folder is created (including a top level folder) a new public/private key pair is created for the folder as described above. This pair makes up the folder private key and folder public key.

The folder public key is stored in the database alongside the information making up the folder record. The folder private key is encrypted with the creating user's public key. The encrypted folder private key is stored in the database, most likely along with the record that grants the creating user permission to access the folder as its creator. When a new item (file or subfolder) is created within any folder, the (file or folder) private key of the newly created content item is encrypted with the public key of the containing folder. This encrypted copy of the new content item private key is stored in the database, typically referenced by the data identifying the new content item itself.

When a folder is shared to a different user, the steps for sharing files described above are carried out, but for the folder private key rather than the file private key. Thus at the end of the steps the database contains a version of the folder private key encrypted with the public key of the user who is being granted permission to access the folder.

Downloading a File from a Shared Folder

When downloading a file from a folder that has been shared to the user, there will be no copy of the file private key encrypted by the user's public key to be found. At this point the server will check the parent folder of the file (and its parent folders) looking for a folder where the user has been granted permission. The database will contain a copy of this folder's private key encrypted with the user's public key (as described above). The user's encrypted private key is retrieved from the database and decrypted using the user secret key. The user's private key is used to decrypt the encrypted folder private key found in accordance with the previous steps. The folder private key can be used to decrypt the file private key or folder private key for any item contained in that folder where the content item file private key is managed as explained above. This allows access either directly to the private key of the file to be downloaded or indirectly (via decrypting the private keys of intermediate folders between the shared folder and the file).

Changing the User Secret Key

In order to update the user secret key—for instance change the passphrase if the secret is based upon a passphrase—the user must provide the server with both the existing and new user secret keys (or equivalently information that can be used to calculate them, such as the existing and new passphrase). The server decrypts the user private key using the existing user secret key and then re-encrypts it using the new user secret key. The newly re-encrypted user private key is then stored in the database replacing the original encrypted user private key.

Resetting the User Secret Key

If the user no longer has access to their user secret key (for example they have forgotten the passphrase which is used to generate it), they cannot use the mechanism described in steps above to reset it. If the user no longer has access to their user secret key and has no means to reset it, they will be unable to access any of their files. This is unacceptable from a usability point of view, so the next sections describe techniques that may be used to allow recovery from user secret key loss while maintaining security.

Storing a User Private Key Backup on the Client

The server may provide a mechanism for the user to download and backup their private key in unencrypted form. The request to download the private key must be accompanied by the user secret key in order to allow the server to decrypt the encrypted private key, so the encryption key can only be backed up by a user who is still in possession of their user secret key. The user should store the backed up private key securely. If a user who has forgotten their passphrase or otherwise lost their user secret key has kept a backup of their unencrypted user private key, the server may offer a mechanism for the user to re-upload their backed up user private key along with a new user secret key. If the server has stored a cryptographic hash of the user private key (or some other one-way mapping or encryption), the server can validate that the correct private key is being uploaded.

The server must also validate the identity of the uploading user in some other manner to ensure that the reset of the user secret key is not being carried out by an unauthorized user. Providing the user is authenticated properly and the correct private key is uploaded, the server can encrypt the user private key using the new user secret key and then store this new encrypted copy of the user private key in the database. The new user secret key will allow the user access to all of their existing files and folders.

Storing a User Private Key Backup on the Server

If the user is unable or unwilling to keep a backup of their user private key, it is possible for the server to store a backup on their behalf. In order to avoid breaching the security of the system, the backup of the user private key on the server must be encrypted and the encryption key must not be stored on the server. The backup of the user private key must therefore be stored on the server encrypted using a key based on information provided by the user. If, at a later point in time the user is able to provide the same information again, the same key will be generated and the user private key will be decrypted correctly. One approach to this problem is to request that the user give answers that are easily memorable to a number of questions. Typical questions might be 'What was your town or place of birth?', 'What was the name of your first pet?', 'What was the name of your first school?'. Depending on the level of security required, the structure of the encrypted key stored may be varied.

For the highest security, the user would need to provide answers to a number of questions, and a single encryption key would be generated from all the answers. This key would then be used to encrypt the user private key and the result would be stored. The user would have to provide exactly the same answers to all the questions to recover the private key at a later time. For a less secure but more usable approach, the user would also need to provide answers to a number of questions. Each answer would be used separately to produce an encryption key and generate an encrypted version of the user private key. All of these versions of the encrypted user private key would be stored. At a later time, the user would only need to answer one of the questions correctly to be able to decrypt and recover the private key.

Other balances between security and ease can be devised—for instance it would be possible to ask the user 4 questions and store 6 copies of the encrypted private key under different encryptions (each copy encrypted by a different pair of answers selected from the 4 questions). In this way the user would be required to answer any 2 questions from 4 correctly to recover their private key.

Storing a User Private Key Backup via an Admin User

If the server provides for a hierarchy of users or the facility for administrative users, backups of users private keys may be stored in the database encrypted by the public key of the user's administrator. When a new user is created and the new user's public and private key are generated, a copy of the private key is encrypted using the public key of the user's administrator and then stored in the database. At a later date, the administrator may provide their user secret key to the server which can then decrypt the administrator's private key, which can then be used to decrypt the private key of any user for which the administrator is responsible. In a corporate environment, the administrator described here would typically be the CIO or someone reporting to the CIO rather than a computer system administrator. By virtue of their ability to access any user's private key the administrator can indirectly access any file stored by one of their users. This property is desirable as it allows the administrator to access the files of a user who has (for example) left the organization, however it requires the administrator to be fully trusted by the organization.

Operating Environment:

The user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and inter-networking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A method executed by a shared computer system that is comprised of data storage of securing a content file associated with a folder data structure stored on the shared computer system, said folder data structure being associated with a public/private encryption key pair and a folder originator, said folder originator being associated with a public/private encryption key pair, the method comprising:
    by a computer, receiving and storing the content file;
    generating a public/private encryption key pair associated with the content file;
    encrypting the content file with the public key associated with the content file;
    retrieving from data storage the public key of the public/private encryption key pair associated with the folder data structure;
    encrypting the private key associated with the content file using the public key of the folder data structure;
    encrypting the private key associated with the folder data structure using the public key associated with the folder originator associated with the folder data structure; and
    preventing access to an unencrypted version of the folder data structure private key and an unencrypted version of the private key associated with the content file.

2. The method of claim 1 further comprising:
    decrypting the folder data structure private key using the folder originator private key;
    obtaining a destination user public key; and
    encrypting the folder data structure private key using the public key of the destination user.

3. The method of claim 1 where the preventing access step is comprised of:
    removing from data storage the unencrypted version of the private key associated with the content file; and
    removing from data storage the unencrypted version of the folder data structure private key.

4. The method of claim 1 where the preventing access step is comprised of:
    encrypting the unencrypted version of the private key associated with the content file; and
    encrypting the unencrypted version of the folder data structure private key.

5. A computer system for securing a content file comprising:
    at least one central processing unit connected using a data channel to at least one data storage device;
    a folder data structure stored on the shared computer system, said folder data structure being associated with a public/private encryption key pair and a folder originator, said folder originator being associated with a public/private encryption key pair;
    said system being adapted to execute a method comprising:
    receiving and storing the content file;
    generating a public/private encryption key pair associated with the content file;
    encrypting the content file with the public key associated with the content file;
    retrieving from data storage the public key of the public/private encryption key pair associated with the folder data structure;
    encrypting the private key associated with the content file using the public key of the folder data structure;
    encrypting the private key associated with the folder data structure using the public key associated with the folder originator associated with the folder data structure; and
    preventing access to an unencrypted version of the folder data structure private key and an unencrypted version of the unencrypted private key associated with the content file.

6. The shared computer system of claim 5 further adapted to execute the method of:
    decrypting the folder data structure private key using the folder originator private key;
    obtaining a destination user public key; and
    encrypting the folder data structure private key using the public key of the destination user.

7. The system of claim 5 further adapted to execute the preventing access by:
    removing from data storage the unencrypted version of the private key associated with the content file; and removing from computer data storage the unencrypted version of the folder data structure private key.

8. The system of claim 5 further adapted to execute the preventing access by:
- encrypting the unencrypted version of the private key associated with the content file; and
- encrypting the unencrypted version of the folder data structure private key.

9. A non-transitory computer storage medium containing program code that, when executed by a shared computer system, causes the shared computer system to execute a method of securing a content file associated with a folder data structure stored on the shared computer system, said folder data structure being associated with a public/private encryption key pair and a folder originator, said folder originator being associated with a public/private encryption key pair, the method comprising:
- receiving and storing the content file;
- generating a public/private encryption key pair associated with the content file;
- encrypting the content file with the public key associated with the content file;
- retrieving from data storage the public key of the public/private encryption key pair associated with the folder data structure;
- encrypting the private key associated with the content file using the public key of the folder data structure;
- encrypting the private key associated with the folder data structure using the public key associated with the folder originator associated with the folder data structure; and
- preventing access to an unencrypted version of the folder data structure private key and an unencrypted version of the unencrypted private key associated with the content file.

10. The non-transitory storage medium of claim 9 further adapted so that the executed method is further comprised of:
- decrypting the folder data structure private key using the folder originator private key;
- obtaining a destination user public key; and
- encrypting the folder data structure private key using the public key of the destination user.

11. The non-transitory storage medium of claim 9 further adapted so that the preventing access is executed by:
- removing from computer data storage the unencrypted private key associated with the content file and
- removing from computer data storage the unencrypted folder data structure private key.

12. The non-transitory storage medium of claim 9 further adapted so that the preventing access is executed by:
- encrypting the unencrypted version of the private key associated with the content file; and
- encrypting the unencrypted version of the folder data structure private key.

* * * * *